(12) United States Patent
Binder et al.

(10) Patent No.: US 10,017,123 B2
(45) Date of Patent: Jul. 10, 2018

(54) ROOF RAIL RETAINER, ROOF RAIL ASSEMBLY, AND VEHICLE HAVING THE ROOF RAIL ASSEMBLY

(71) Applicant: Hans und Ottmar Binder GmbH & Co. KG, Böhmenkirch (DE)

(72) Inventors: Hans Binder, Böhmenkirch (DE); Ottmar Binder, Böhmenkirch (DE); Stefan Sirrenberg, Wuppertal (DE); Marcus Hippe, Düsseldorf (DE)

(73) Assignee: SUDDEUTSCHE ALUMINUM MANUFAKTUR GMBH, Bohmenkirch (DE)

( * ) Notice: Subject to any disclaimer, the term of this patent is extended or adjusted under 35 U.S.C. 154(b) by 115 days.

(21) Appl. No.: 14/770,131

(22) PCT Filed: Jan. 8, 2014

(86) PCT No.: PCT/EP2014/050221
§ 371 (c)(1),
(2) Date: Aug. 25, 2015

(87) PCT Pub. No.: WO2014/131530
PCT Pub. Date: Sep. 4, 2014

(65) Prior Publication Data
US 2016/0009227 A1    Jan. 14, 2016

(30) Foreign Application Priority Data
Feb. 26, 2013 (DE) .................. 10 2013 003 133

(51) Int. Cl.
*B60R 9/00* (2006.01)
*B60R 9/04* (2006.01)

(52) U.S. Cl.
CPC ..................... *B60R 9/04* (2013.01)

(58) Field of Classification Search
CPC ........... B60R 9/04; B60R 9/048; B60R 9/058; B60R 9/10
See application file for complete search history.

(56) References Cited

U.S. PATENT DOCUMENTS 5,069,377 A * 12/1991 Baughman ............... B60R 9/00
                                                         224/321
7,980,437 B2    7/2011 Binder et al.
(Continued)

FOREIGN PATENT DOCUMENTS

DE          8621340 U1      7/1989
DE          4004829 A1      8/1991
(Continued)

OTHER PUBLICATIONS

English Translation of International Preliminary Report on Patentability (Ch. II) for PCT/EP2014/050221, dated Aug. 26, 2015.
(Continued)

*Primary Examiner* — Derek Battisti
(74) *Attorney, Agent, or Firm* — Stephen T. Olson; Harness, Dickey & Pierce, P.L.C.

(57) ABSTRACT

A roof rail retainer with an adapter component, has a fastening apparatus for mounting on a roof of a vehicle and a fastening device for mounting a roof rail of the vehicle. The fastening apparatus has a bolt element which is preferably provided with a thread and is surrounded by a compressible sealing ring. At least one supporting element is associated with the bolt element and on the one hand lies in contact with the adapter component or is connected to the adapter component, and on the other hand has at least one supporting surface which can be placed onto the roof of the vehicle. A thickness of the uncompressed sealing ring as viewed in an axial direction of the bolt element is greater than the supporting length of the supporting element.

20 Claims, 8 Drawing Sheets

(56) References Cited

U.S. PATENT DOCUMENTS

| | | | |
|---|---|---|---|
| 8,720,761 B2 | 5/2014 | Binder et al. | |
| 9,248,864 B2* | 2/2016 | Eberle | B60R 9/04 |
| 2007/0138221 A1* | 6/2007 | Binder | B60R 9/04 |
| | | | 224/322 |
| 2007/0194069 A1* | 8/2007 | Binder | B60R 9/04 |
| | | | 224/326 |
| 2008/0099519 A1 | 5/2008 | Binder et al. | |
| 2009/0026238 A1* | 1/2009 | Binder | B60R 9/04 |
| | | | 224/309 |
| 2009/0045651 A1* | 2/2009 | Binder | B60R 13/04 |
| | | | 296/191 |
| 2009/0145941 A1* | 6/2009 | Kiyota | B60R 9/04 |
| | | | 224/326 |
| 2010/0264179 A1* | 10/2010 | Johnson | B60R 9/045 |
| | | | 224/315 |
| 2012/0248164 A1* | 10/2012 | Aftanas | B60R 9/058 |
| | | | 224/309 |

FOREIGN PATENT DOCUMENTS

| | | |
|---|---|---|
| DE | 44 22 421 C1 | 9/1995 |
| DE | 10239022 A1 | 3/2004 |
| DE | 10259430 A1 | 7/2004 |
| DE | 102005018158 A1 | 4/2006 |
| DE | 102011051013 A1 | 12/2012 |
| EP | 2532568 A2 | 12/2012 |
| WO | WO-2006/111228 A1 | 10/2006 |

OTHER PUBLICATIONS

International Search Report for PCT/EP2014/050221, ISA/EP, dated Feb. 20, 2014.

International Preliminary Report on Patentability (Ch.II) with annexes and their translation, IPEA/EP, Berlin, issued Feb. 20, 2015.

* cited by examiner

ROOF RAIL RETAINER, ROOF RAIL ASSEMBLY, AND VEHICLE HAVING THE ROOF RAIL ASSEMBLY

CROSS-REFERENCE TO RELATED APPLICATIONS

This application is a 371 U.S. National Stage of International Application No. PCT/EP2014/050221, filed Jan. 8, 2014, which claims the benefit of and priority to German Patent Application No. 102013003133.8, filed Feb. 26, 2013. The disclosures of the above applications are incorporated herein by reference.

The invention relates to a roof rail retainer, comprising an adapter component which has a fastening apparatus for mounting on a roof of a vehicle and a fastening device for mounting a roof rail of the vehicle.

A roof rail which is formed as a roof strip and has a contact surface which can be placed substantially consistently onto the roof of the vehicle is known from DE 10 2005 018 158 A1. The bearing surface has at least one recess into which is inserted a slot nut from which a threaded bolt extends which is introduced into a fastening opening in the roof of the vehicle. Thus the roof strip is disposed directly on the roof of the vehicle.

The invention is based on a different situation, in which the roof rail is not or cannot be fastened directly on the roof of a vehicle, but by the interposition of a roof rail retainer. Therefore the roof rail retainer is fastened on the roof of the motor vehicle, and the roof rail, for example in the form of a roof strip, is fastened on the roof rail retainer.

The object of the invention is to create a roof rail retainer of the type referred to above, which can be fastened fixedly and securely on the roof of the vehicle without dirt and/or moisture entering the interior of the roof.

In a roof rail retainer of the type referred to above this object is achieved in that the fastening apparatus has a bolt element which is preferably provided with a thread and is surrounded by a compressible sealing ring, wherein at least one supporting element is associated with the bolt element and on the one hand lies in contact with the adapter component or is connected to the adapter component, in particular connected as a separate part to the adapter component or connected integrally to the adapter component, and on the other hand has at least one supporting surface which can be placed onto the roof of the vehicle and wherein—as viewed in the axial direction of the bolt element—the thickness of the uncompressed sealing ring is greater than the supporting length of the supporting element. In this application a roof strip is specified in the invention as a roof rail and only one roof rail retainer is described. However, the invention is not limited to this, since as a roof rail it is also possible to use a rail having feet and not a roof strip which has no feet and which with its underside the follows the roof contour. Furthermore, a plurality of roof rail retainers distributed over the length of the rail are generally associated with the respective rail. Furthermore, a vehicle generally has two roof rails disposed parallel to one another, even if only one is described in the application. The compressible sealing ring which surrounds the bolt element serves for sealing a fastening opening on the roof of the vehicle. When the roof rail retainer is mounted on the roof of the vehicle by means of insertion of the bolt element into the fastening opening, the sealing ring is compressed so that it lies in contact on the one hand in a sealing manner so as to form a roof rail retainer and on the other hand in a sealing manner on the outer face of the roof of the vehicle, so that the fastening opening is shielded in a sealing manner towards the exterior and therefore no dirt and/or no moisture etc. can penetrate into the roof. However, the pressure of the sealing ring is independent of the tensile force by which the bolt element is fastened to the roof of the vehicle. This is because the at least one supporting element is associated with the bolt element and on the one hand lies in contact with the adapter component or is connected to the adapter component and on the other hand has at least one supporting surface which can be placed onto the roof of the vehicle, and thus is supported there. Thus if the bolt element is fixed to the roof of the vehicle the supporting element acts as a spacer which prevents further compression of the sealing ring and also achieves a block fastening, in particular a block screw connection. This may be understood to mean that in the region of the fastening apparatus the supporting element, the metal sheet of the roof of the vehicle as well as at least one lower roof component located in the interior of the roof and an element disposed or mounted on the bolt element, in particular a securing nut screwed onto the thread of the bolt element, as well as optionally also the adapter component lie in contact, so that a retaining force which is also constant for long periods acts in order to retain the roof rail retainer. If in particular a screw connection is performed for fastening of the bolt element, a block screw connection can be produced in which there are no reductions of torque but a constant screw connection torque is permanently maintained. Nevertheless the sealing ring is optimally and not excessively compressed, so that even in the long term a secure sealing against dirt and moisture is achieved. As an alternative to the securing nut which is screwed onto the thread of the bolt element, it is also possible that the bolt element is provided with a step or the like, in particular with a head, wherein the step, in particular the head, is supported on the lower roof component—if appropriate, with the interposition of a washer or the like. Furthermore the bolt element is fastened to the adapter component, in particular screwed thereto. This screwing to the adapter component can take place directly or indirectly. In the case of direct screwing the bolt element provided with a thread engages in a threaded hole of the adapter component, and in the case of indirect screwing a threaded element is provided on the adapter component, in particular fastened thereon, and the thread of the bolt element is screwed into the thread.

According to a modification of the invention it is provided that the bolt element is a stud bolt, a threaded rod or a threaded screw.

According to a modification of the invention it is provided that the supporting element is disposed between the bolt element and the sealing ring. Consequently it is located in a free space lying between the bolt element and the sealing ring, i.e. the sealing ring does not lie in close contact on the circumference of the bolt element, but maintains a spacing in order to create the free space there. Additionally or alternatively it is also possible that the supporting element lies on a side of the sealing ring which faces away from the bolt element. If only this configuration is present, it is not necessary for the sealing ring to surround the bolt element with a spacing. It is always important that the sealing ring is designed in such a way that it surrounds the fastening opening provided on the roof of the vehicle in such a way that no dirt and no moisture can penetrate from the exterior.

The supporting element may be a cohesive component or it may consist of a plurality of individual supporting elements which are distributed.

A modification of the invention provides that the sealing ring surrounds the supporting element, in particular the annular supporting element. Therefore the supporting element and the sealing ring do not overlap axially, but lie radially adjacent to one another.

According to a modification of the invention it is provided that the supporting element is fastened on the bolt element or is formed integrally with the bolt element. The supporting element preferably forms a step, in particular an annular step, on the bolt element, wherein such an annular component can be pushed onto the bolt element and can be fastened there or this component is formed integrally on the bolt element. In particular it is provided that the supporting element is a flange of the bolt element. The bolt element is preferably designed as a double bolt, i.e. it has two bolt sections with a flange located between them, wherein the two bolt sections and the flange are formed integrally with one another. In particular the double bolt can have two bolt sections each provided with a thread, wherein the flange is located between the bolt sections. One bolt section provided with a thread belongs to the fastening device, so that it serves for fastening the roof rail, in particular the roof strip, and the other bolt section belongs to the fastening apparatus by which the fastening of the roof rail retainer on the roof of the vehicle is carried out.

According to a modification of the invention it may also be provided that the supporting element is a ring element attached to the bolt element. After the attachment to the bolt element the ring element is either connected thereto, for example by welding, or the ring element is a nut-like ring element, i.e. it has an internal thread and can be screwed onto the bolt element for attachment thereto. Alternatively it may be provided that the ring element is pushed loosely onto the bolt element to such an extent that it is supported on the adapter component.

According to a further embodiment of the invention it is provided that the supporting element is fastened on the adapter component or is formed integrally with the adapter component. In this respect the supporting element is not a component which belongs to the bolt element or is fastened to the bolt element, but it is fastened to the adapter component in the vicinity of the bolt element or is formed integrally there. For example it may be produced by embossing on the adapter component (embossed supporting element).

A preferred embodiment of the invention provides that the sealing ring or the sealing ring together with the supporting element is disposed in a recess in the adapter component. In this case in particular it is provided that the depth of the recess is just as great as the supporting length of the supporting element. The consequence of this is that regions of the adapter component adjoining the recess are located at the same height as the supporting surface of the supporting element which can be placed onto the roof of the vehicle, so that these regions and the supporting surface rest on the outer face of the roof of the vehicle.

It is advantageous if the recess is an impression in the adapter component. As a result very simple manufacture is possible.

A modification of the invention provides that the adapter component has a contact surface for bearing on the roof of the vehicle. This contact surface preferably consists of the aforementioned regions of the adapter component.

A modification of the invention provides that the bolt element is fastened to the adapter component by means of a screw fastening. This preferably takes place by means of the aforementioned bolt section of the bolt element provided with a thread. The screw fastening to the adapter part can preferably be performed by means of an insert nut fastened to the adapter component. Instead of the insert nut other threaded elements can also be used which are fastened to the adapter part.

A modification of the invention provides that the adapter component is a sheet metal component. This can be produced very simply. In particular the sheet metal component is designed as a C-profile. In this case it is preferably provided that the C profiling of the C profile is produced by bending of the sheet metal component. Therefore by stamping and bending the sheet metal component can be stamped out of a metal sheet and then bent in order to produce the C profiling.

In particular it is provided that the fastening device is offset with respect to the fastening apparatus in the longitudinal direction of the C profile. The consequence of this is that both the fastening device and also the fastening apparatus are accessible, since they do not overlap reciprocally, so that the fastening on the roof of the vehicle and also the fastening of the roof rail is simplified.

A modification of the invention provides that the C profile has two profile bars, and that one of the profile bars has the fastening apparatus and the other one of the profile bars has the fastening device, wherein the other profile bar has a cut-out for access to the region of the fastening apparatus located in the interior of the C profile. Access from the exterior to the fastening apparatus is possible through the cut-out.

The invention also relates to a roof rail assembly with a roof rail retainer, as has been explained above, as well as with a roof rail which is fastened to the adapter component by means of the fastening device. The fastening device preferably has at least one screw fastening by which the roof rail, in particular the roof strip, is fastened to the adapter component.

The invention also relates to a vehicle having a roof rail assembly, as has been explained above, wherein the roof of the vehicle having at least one roof panel and a lower roof component has a fastening opening into which the bolt element is inserted, and having a fastening element which is disposed on or attached to the bolt element and is supported on the underside of the lower roof component so that the supporting element, roof panel, lower roof component and fastening element as well as optionally the adapter component lie in contact with one another. Due to the placing of the different components in contact with one another a secure fastening, acting in the long term with a constant retaining force, of the roof rail retainer on the roof of the vehicle is ensured without impairing the sealing properties of the sealing ring over the course of time. The fastening element disposed on or attached as above to the bolt element may be—in an exemplary embodiment of the invention—a securing nut which is screwed onto the bolt element provided with a thread or may be a step, in particular a head, of the bolt element, in particular when the bolt element is formed as a threaded screw.

Finally it is advantageous if at least one washer is disposed between the underside of the lower roof component and the fastening element. The washer serves for the introduction of force over a large surface area. It belongs to the above-mentioned components which lie in contact with one another.

The drawings illustrate the invention with reference to an embodiment, and in these drawings.

Figure 1:
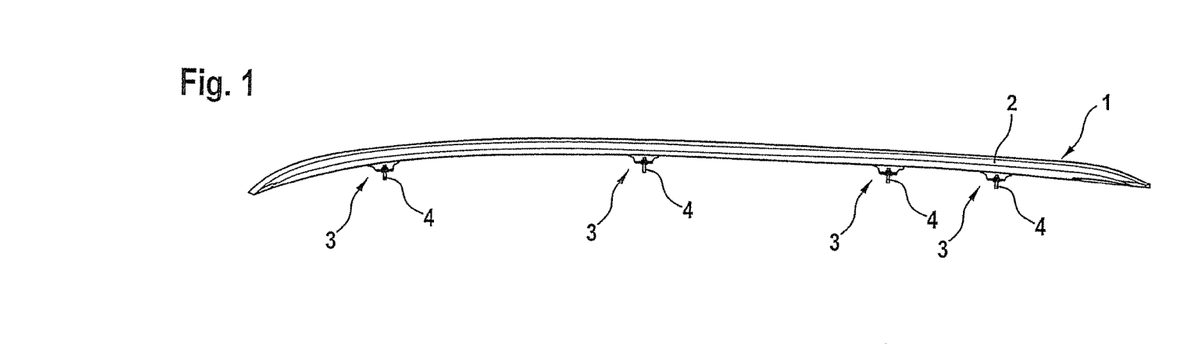
FIG. 1 shows a side view of a roof rail formed as a roof strip and having a plurality of roof rail retainers.

FIG. 1 shows a roof rail 1 which is formed as a roof strip 2 and is fastened to the roof of a vehicle (not shown). The roof rail 1 is fastened to the roof of the vehicle by means of a plurality of roof rail retainers 3. In FIG. 1 four roof rail retainers 3 are shown which are distributed over the length the roof rail 1 and are fastened thereto. For the fastening of the roof rail 1 it is merely necessary to deliver it, in particular with the roof rail retainer 3 fastened thereto, to the roof of the vehicle in such a way that bolt elements 4, which may be formed in particular as stud bolts 4', of the roof rail retainer 3 penetrate into fastening openings in the roof of the vehicle, so that from the inner face of the roof fastening elements can be affixed to the bolt elements, whereby the roof rail 1 is retained securely and fixedly on the roof of the vehicle. A vehicle preferably has two roof rails 1 extending parallel to one another on the roof. Alternatively—in another embodiment of the roof rail retainer—the fastening to the roof of the vehicle can take place in such a way that the roof rail with the roof rail retainers fastened thereto is delivered to the roof of the vehicle from the exterior and that bolt elements are pushed through the fastening openings of the roof from the interior of the roof and are screwed directly or indirectly to the roof rail retainers 3.

Figure 2:
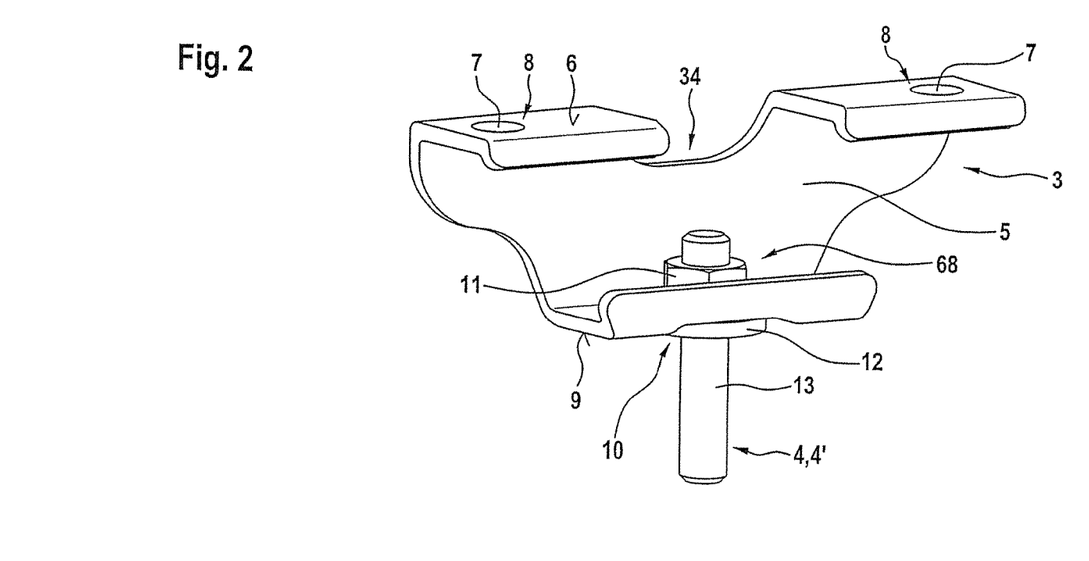
FIG. 2 shows a roof rail retainer in a perspective view.

FIG. 2 shows a roof rail retainer 3 in a perspective representation. The roof rail retainer 3 has an adapter component 5 which has fastening holes 7 of a fastening device 8 on its upper face 6. The fastening device 8 serves to fasten the adapter component 5 to the roof rail 1. On the underside 9 thereof the adapter component 5 has a fastening apparatus 10 to which the stud bolt 4' belongs. The fastening apparatus 10 serves to fasten the roof rail retainer 3 to the roof of the vehicle. The fastening apparatus 10 is preferably formed as a screw fastening (68) and also has an insert nut 11 fixed to the adapter component 5. A compressible sealing ring 12 is associated with the stud bolt 4'. The sealing ring 12 surrounds the stud bolt 4' and lies in contact with the underside 9 of the adapter component 5.

Figure 3:
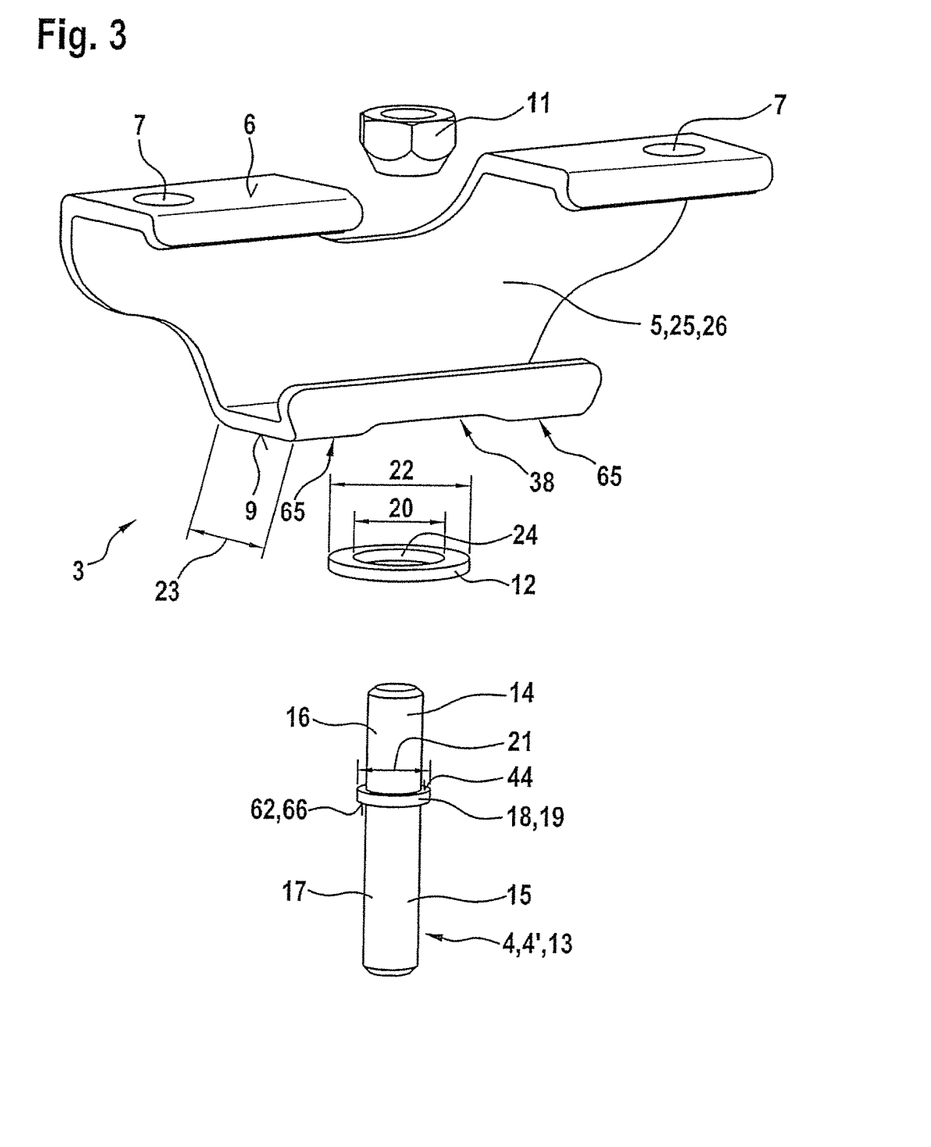
FIG. 3 shows the roof rail retainer according to FIG. 2 in an exploded view.

FIG. 3 clarifies the structure of the roof rail retainer 3 in an exploded view. It can be seen that the stud bolt 4' is formed as a double bolt 13 which has two bolt sections 14 and 15. The two bolt sections 14 and 15 are provided with threads 16, 17. A supporting element 18 which forms a flange 19 of the double bolt 13, that is to say of the stud bolt 4', is located between the two bolt sections 14 and 15. The stud bolt 4' is formed in one piece, i.e. the two bolt sections 14 and 15 provided with the threads 16 and 17 as well as the flange 19 are designed in one piece with one another. The sealing ring 12, which is preferably made of foam rubber, has an internal diameter 20 which is greater than the diameter 21 of the annular flange 19. The external diameter 22 of the sealing ring 12 is approximately as great as the depth 23 of the adapter component 5 in the region of the underside 9 thereof. The flange 19 and the sealing ring 12—in plan view—are of circular design. Accordingly the internal diameter 20 defines an annular opening 24 of the sealing ring 12 which is likewise of circular design in plan view.

Figure 4:
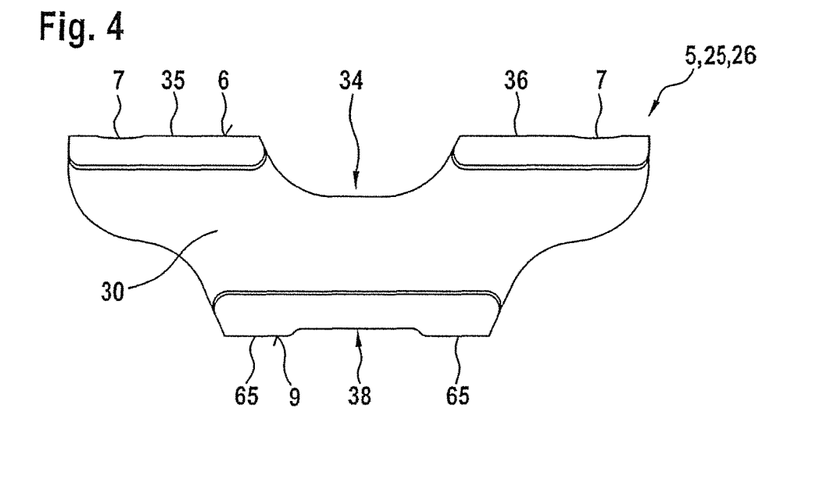
FIGS. 4 to 6 show an adapter component of the roof rail retainer in various views.
Figure 5:
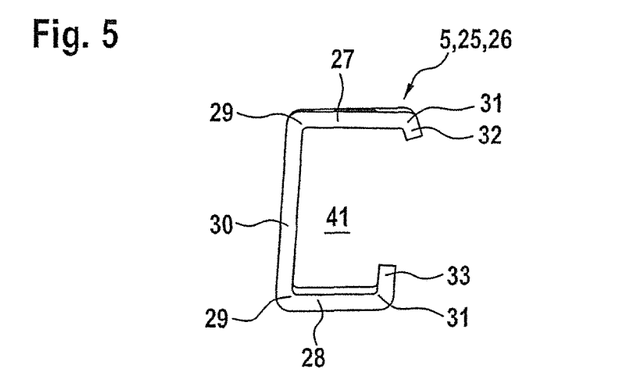
Figure 6:
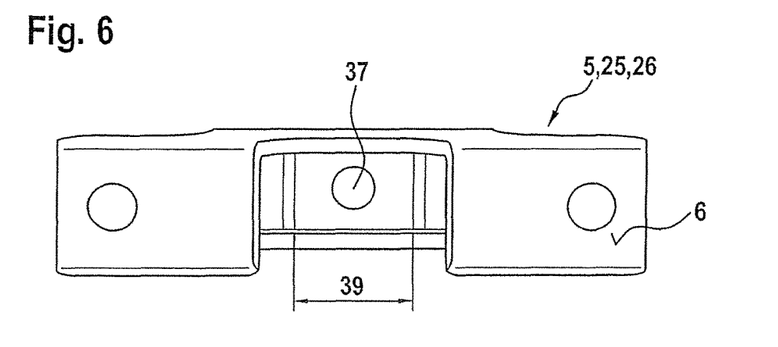

FIGS. 4 to 6 show the structure of the adapter component 5. FIG. 4 shows a side view, FIG. 5 shows an end view and FIG. 6 shows a plan view of the upper face 6 of the adapter component 5. The adapter component 5 is produced in one piece from sheet metal, i.e. it is a sheet metal component 25. According to the end view shown in FIG. 5 it is provided with a C profiling, so that it is formed as a C profile 26. The C profile 26 has two profile bars 27 and 28 which merge by means of 90° bends 29 into a back bar 30. Furthermore the profile bars 27 and 28 merge by means of bends 31 into short front bars 32 and 33. The bends 31 likewise have bending angles in the region of 90° or—as can be seen in FIG. 5—less than 90°. The front bars 32 and 33 act as reinforcing bars of the sheet metal component 25.

According to FIG. 4 a cut-out 34, which interrupts the profile bar 27 as well as the front bar 32 and protrudes a little further into the back bar 30, is located in the region of the upper face 6 of the adapter component 5. In this way the profile bar 27 is divided into two profile bar portions 35 and 36, the cut-out 34 being located between the two profile bar portions 35 and 36. The length of the two profile bar portions 35 and 36 together with the length of the cut-out 34 is greater than the length of the profile bar 28. The profile bar 28 preferably has a length which is greater than the length of the cut-out 34 (FIG. 4). One of the fastening holes 7 is located in the profile bar portion 35 and the other one of the fastening holes 7 is located in the profile bar portion 36. The profile bar 28 is provided with a fastening hole 37 which belongs to the fastening apparatus 10. Furthermore the profile bar 28 has in the region of its underside 9 a recess 38 which extends over the entire depth 23 of the profile bar 28 and in which the fastening hole 37 is located—preferably approximately centrally. According to FIG. 6 the length 39 of the recess 38 is smaller, preferably somewhat less than the length of the cut-out 34. The recess 38 has for instance a square plan view. It is preferably formed by a stamping operation of the sheet metal wall of the sheet metal component 25, that is to say of the adapter component 5.

Figure 7:
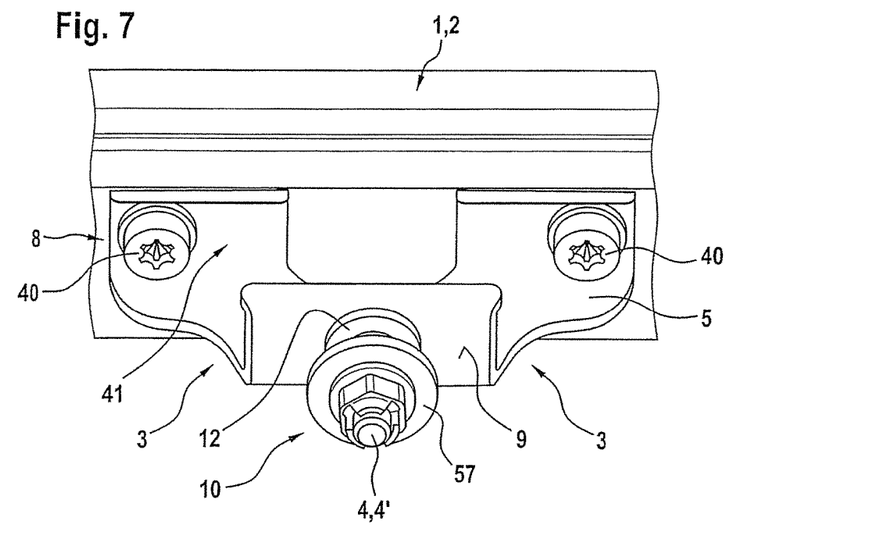
FIGS. 7 and 8 show the roof rail retainer fastened to the roof rail in a side view and a perspective view from below.
Figure 8:
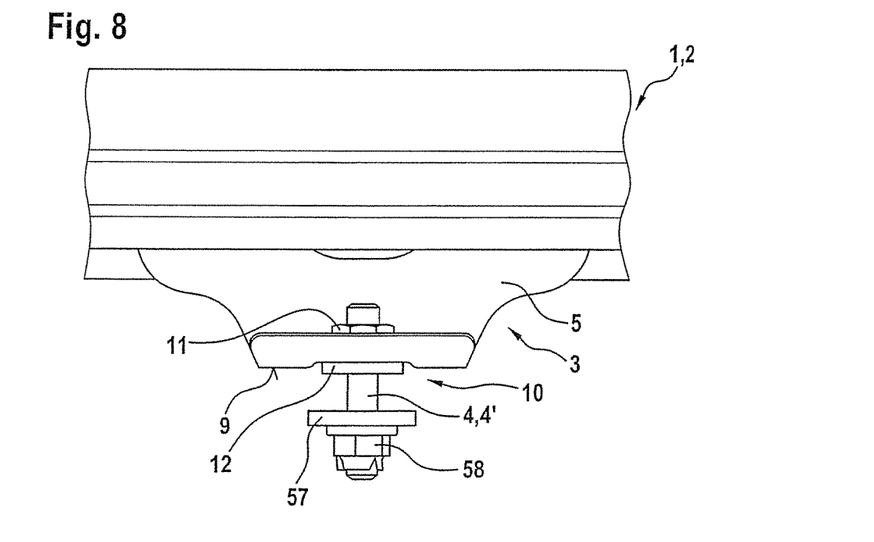
Figure 9:
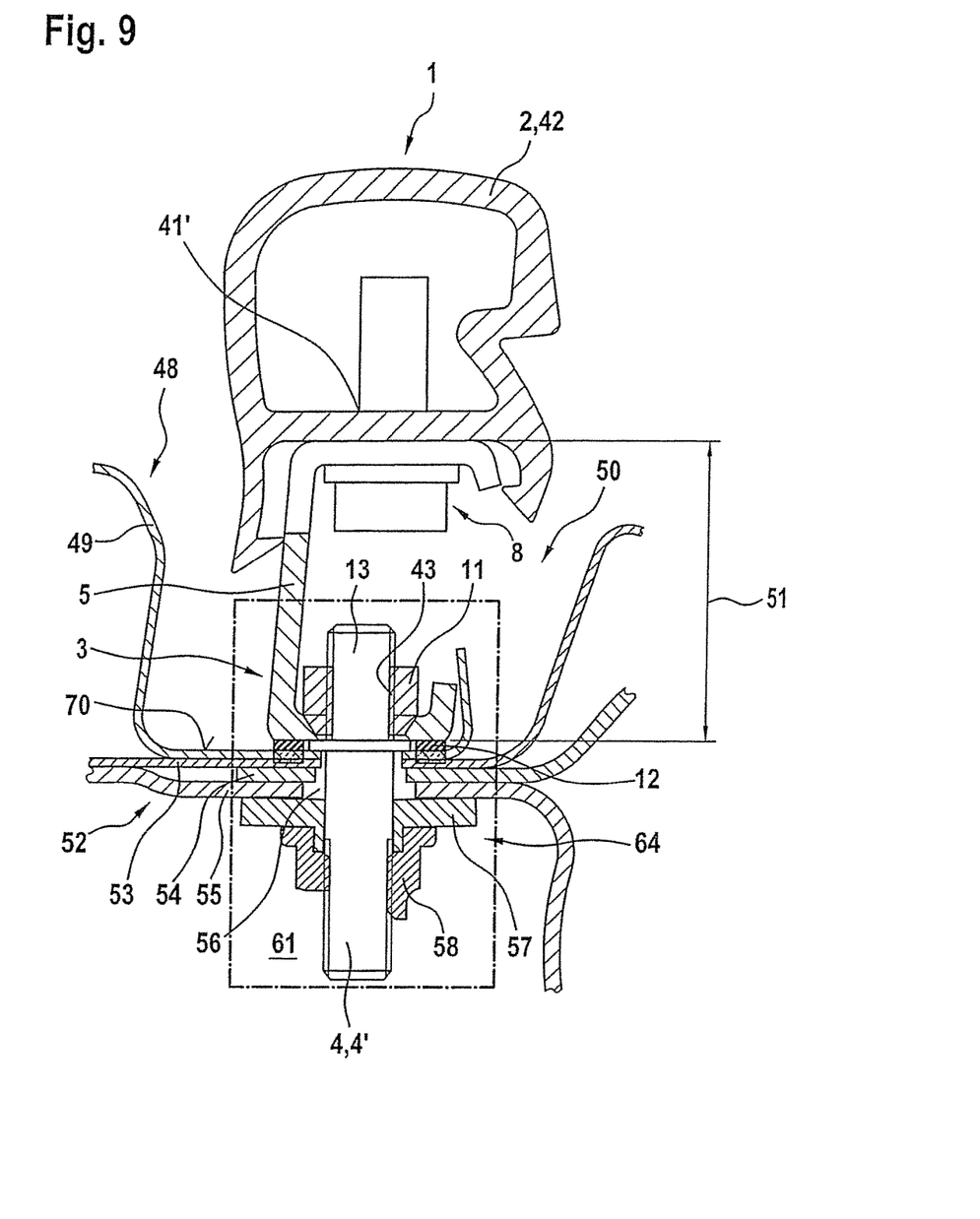
FIG. 9 shows a sectional view through a roof rail assembly which is fastened to a roof of a vehicle with the roof rail retainer and the roof rail.

According to FIGS. 7 to 9 the roof rail retainer 3 is connected by means of two threaded screws 40 to the roof rail 1, in particular the roof strip 2. For this purpose the respective threaded screw 40 is inserted from the interior of the C profile 26 through the corresponding fastening hole 7 and is screwed into a threaded hole 41' (FIG. 9) on the underside of the roof rail 1, in particular the roof strip 2. Instead of threaded screws 40, other fastening means such as for example rivets or the like could also be used. As can be seen from FIG. 9, the roof strip 2 is preferably formed as a hollow profile 42, so that the screwed-in threaded shank of the threaded screw 40 or a corresponding region of a rivet or the like can be accommodated in the interior of the hollow profile 42. The rivet is preferably a blind rivet.

According to FIGS. 8 and 9 the insert nut 11 is fastened to the profile bar 28 from the interior 41 of the C profile 26 in such a way that the internal thread 43 is aligned with the fastening hole 37. The insert nut 11 is firmly connected to the adapter component 5 by a pressing-in operation. From the underside 9 of the adapter component 5 the stud bolt 4' with its bolt section 14 provided with a thread 16 is screwed into the internal thread 43 of the insert nut 11, i.e. the bolt section 14 passes through the fastening hole 37 and then engages in the internal thread 43. The screwing in takes place in such a way that the flange 19 lies with its upper face 44 firmly in contact on the underside 9 in the region of the recess 38. The flange 19 forms the supporting element 18, i.e. it lies in contact with the profile bar 28 and thus in contact with the adapter component 5. According to FIG. 10 the supporting length 45, which corresponds to the thickness of the flange 19, is the same as the depth 46 of the recess 38. Furthermore it can be seen from FIG. 10 that the supporting element 18 is surrounded by the sealing ring 12, wherein in FIG. 10 the sealing ring 12 is shown both compressed and also uncompressed. The compressed state is not shown by dashes, whereas the uncompressed state is made up of the area without dashes and with dashes. In the uncompressed state the sealing ring has a thickness 47 which is greater than the supporting length 45 of the supporting element 18.

Figure 10:
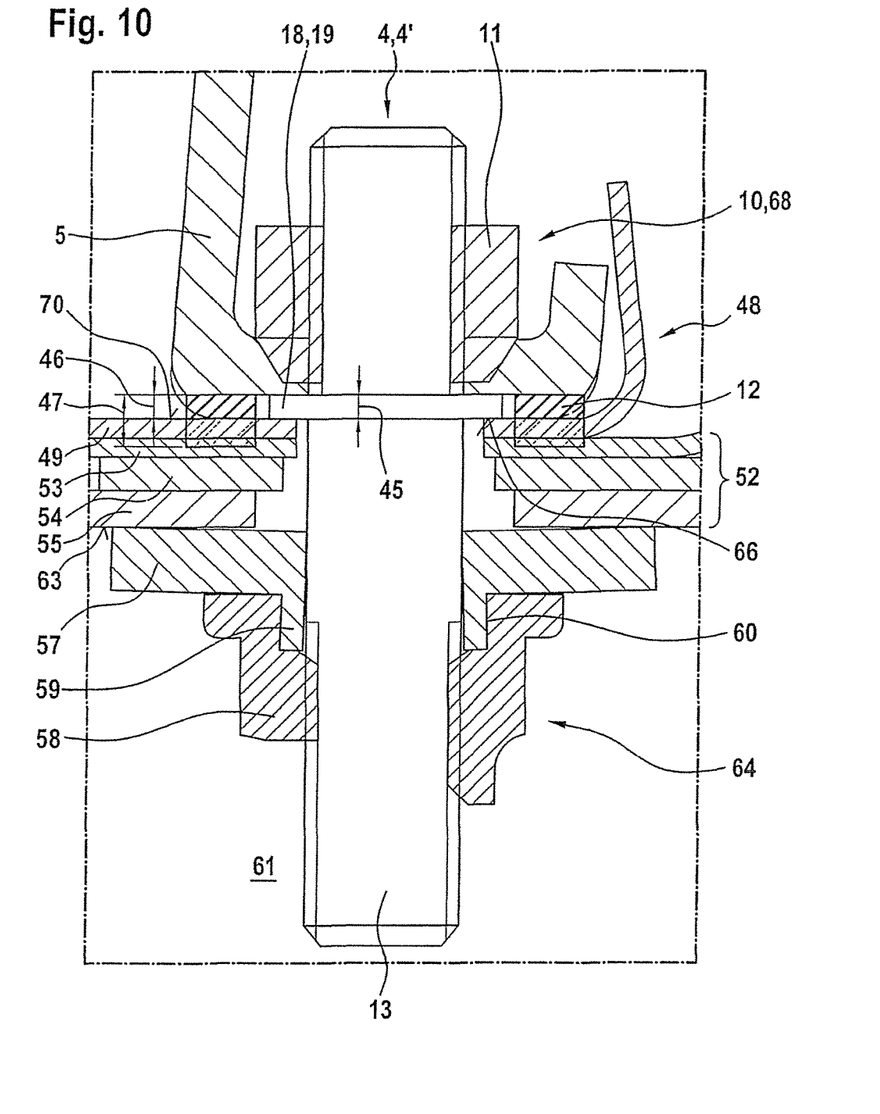
FIG. 10 shows an enlarged representation of a region identified in FIG. 9 by a frame.
Figure 11:
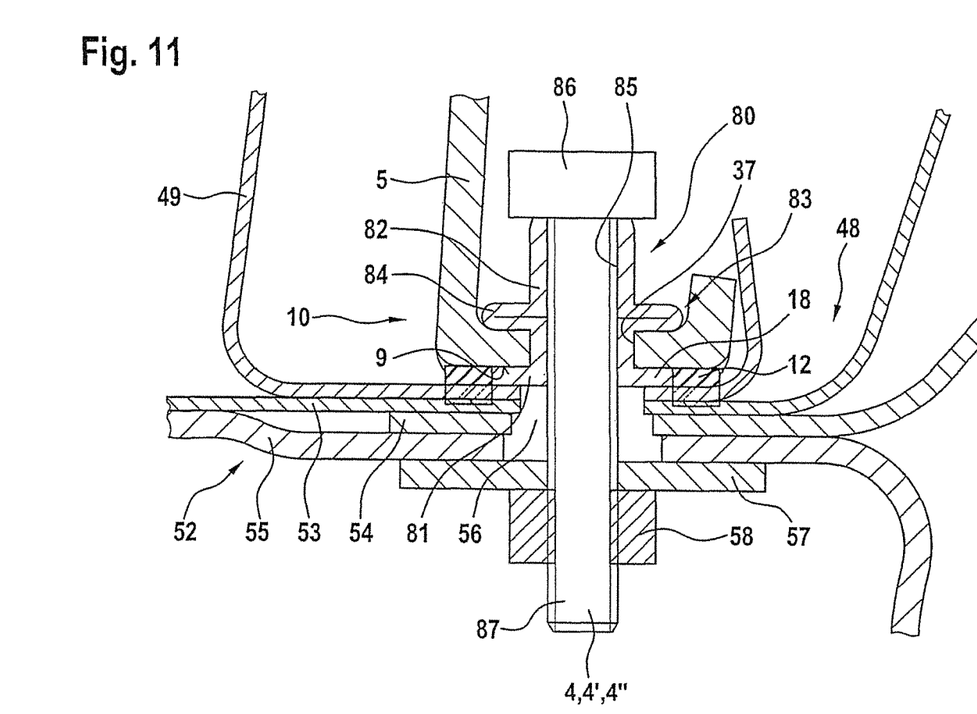
FIG. 11 shows a further exemplary embodiment of a roof rail retainer in the region of a fastening apparatus in a sectional view and FIG. 12 shows a further exemplary embodiment of a roof rail retainer in a representation corresponding to FIG. 10.

FIGS. 10 and 11 show the roof rail 1 fastened by means of the roof rail retainer 3 on a roof 48 of a vehicle. The roof 48 has an external roof panel 49 which with one region forms a roof channel 50 in which the roof rail retainers 3 (FIG. 1) are fastened which in turn support the roof rail 1. The height 51 of the roof rail retainers 3 corresponds approximately to the depth of the roof channel 50. Furthermore the roof 48 of the vehicle has a lower roof component 52 which is composed of a plurality of metal sheets, struts or the like 53, 54 and 55, wherein the roof panel 49 and the lower roof component 52 lie in contact with one another and a fastening opening 56 extends through the entire roof 48 of the vehicle. This means that the fastening opening 56 is formed by corresponding openings in the roof panel 49 and the metal sheets, struts or the like 53, 54 and 55. In this case it is possible that the diameters of the various openings are of different sizes in order to be able to compensate for tolerances. As mentioned, the roof panel 49 and the metal sheets, struts or the like 53, 54 and 55 lie in contact with one another or are clamped in contact with one another when the roof rail retainer 3 is fitted.

It can be seen from FIGS. 7 to 10 that a washer 57 which is acted on by a securing nut 58 is fitted onto the bolt section 15 of the stud bolt 4'. The securing nut 58 constituting a fastening element 69 is preferably designed as a self-locking securing nut. According to FIG. 10 it may be provided that the washer 57 is not disc-shaped but is provided with an annular web 59 which engages axially in an annular recess 60 in the securing nut 58. However, the design with the annular web 59 and the annular recess 60 is optional.

For the fastening of the roof rail retainer 3 on the roof 48 of the vehicle the procedure is as follows. In the following description the fitting is explained only with reference to one of the roof rail retainers 3, since a corresponding procedure is employed for the other roof rail retainers 3 (FIG. 1). The roof rail retainer 3 screwed to the roof rail 1 is inserted with its stud bolt 4' into the fastening opening 56 of the roof 48. The stud bolt 4' is previously—as explained—screwed into the insert nut 11, so that the supporting element 18 thereof is in contact with the adapter component 5. Furthermore the supporting element 18 is surrounded by the sealing ring 12 which is retained for example by means of a self-adhesive coating on the underside 9 of the adapter component 5. However, it can also be loosely installed, although this makes handling difficult, or can be pre-fixed in some other way. Due to the insertion of the stud bolt 4' into the fastening opening 56 of the roof 48 of the vehicle the bolt section 15 projects downwards out of the fastening opening 56, that is to say into the interior of the roof 61. From there the washer 57 is placed on the bolt section 15 and then the securing nut 58 is screwed onto the thread 17 of the bolt section 15. When the securing nut 58 is tightened the underside 62 of the supporting element 18 (FIG. 3), which forms a support surface 66 (FIG. 10), lies in contact with the outer face 70 of the roof panel 49. Furthermore the sealing ring 12 is compressed from its original thickness 47 to the supporting length 45 or the depth 46 of the recess 38, so that it lies with one side in contact in a sealing manner on the adapter component 5 and with its other side in contact in a sealing manner on the outer face 70 of the roof 48 of the vehicle and surrounds the fastening opening 56 in a sealing manner, so that no dirt and no moisture etc. can penetrate from the exterior into the fastening opening 56 and thus into the interior of the roof 48. Furthermore, due to the screwing on of the securing nut 58 the washer 57 is pushed in contact with the underside 63 (FIG. 10) of the lower roof component 52, namely the lower metal sheet, the lower strut or the like 55, wherein the securing nut 58 also comes in contact with the washer 57. The securing nut 58 can be tightened with a defined torque, wherein this torque is always maintained because of the block screw connection 64 since there is no flexibility. The block screw connection 64 is achieved by placing the adapter component 5, supporting element 18, roof panel 49 as well as the lower roof component 52, washer 57 and securing nut 58 in contact. Nevertheless the sealing ring 12 is only compressed to a predetermined extent which results from the supporting length 45 of the supporting element 18. Both the underside 62 of the supporting element 18 and also the regions 65 (FIG. 3) of the underside 9 of the profile bar 28 lie on the outer face 70 of the roof panel 49, since the supporting length 45 of the supporting element 18 is just as great as the depth 46 of the recess 38. In this respect the regions 65 form a contact surface 67 for bearing on the roof 48 of the vehicle.

It follows from all of this that on the basis of the invention a secure and stable fixing of the roof rail 1 on the roof 48 of the vehicle takes place by means of the roof rail retainer 3 or a plurality of roof rail retainers 3, wherein simultaneously a seal is created by means of the sealing ring 12, so that nothing can penetrate into the interior of the roof 48 from the exterior.

FIG. 11 shows a further exemplary embodiment of a roof rail retainer in the region of a fastening apparatus 10. It also shows the roof 48 of the vehicle (not shown in greater detail) with a roof panel 49 and a lower roof component 52 with metal sheets 53, 54 and 55. All configurations shown and described for the exemplary embodiment of FIGS. 1 to 10 are applicable except for the following differences. The differences relate to the screw fastening 68 as well as the bolt element 4. Instead of the screw fastening 68 and the double bolt 13 according to the embodiment of FIGS. 1 to 10, in the exemplary embodiment of FIG. 11 a blind rivet 80, also referred to as a spacer rivet, is provided, which is riveted to the fastening hole 37 of the adapter component 5. The blind rivet 80 has a head 81, a shank 82 and a deformation zone 83 which is formed on the shank 82. The blind rivet 80 is inserted into the fastening hole 37, so that the head 81 is supported on the underside 9 of the adapter component 5. The head 81 forms the supporting element 18. Then the deformation zone 83 of the blind rivet 80 is deformed by a corresponding tool in such a way (as can be seen from FIG. 11) that a flange 84 is formed. Therefore the adapter component 5 is gripped between the head 81 and the flange 84. A through channel 85 into which a bolt element 4, preferably in the form of a threaded screw 4", is inserted from the side of the roof rail passes through the blind rivet 80. It is also conceivable that—as described above—the blind rivet 80 is deformed by means of the bolt element 4 or the threaded screw 4". The threaded screw 4" screwed into the blind rivet 80 effectively forms a stud bolt 4'. The fastening of the roof rail retainer 3 on the roof 48 of the vehicle takes place in a corresponding manner, as described in the exemplary embodiment of FIGS. 9 and 10. The threaded screw 4" is supported with its head 86 on the blind rivet 80 and a securing nut 58, which in the exemplary embodiment of FIG. 11 is not illustrated as a self-locking nut but alternatively may also be self-locking, is screwed onto the threaded shank 87 of the threaded screw 4".

Figure 12:
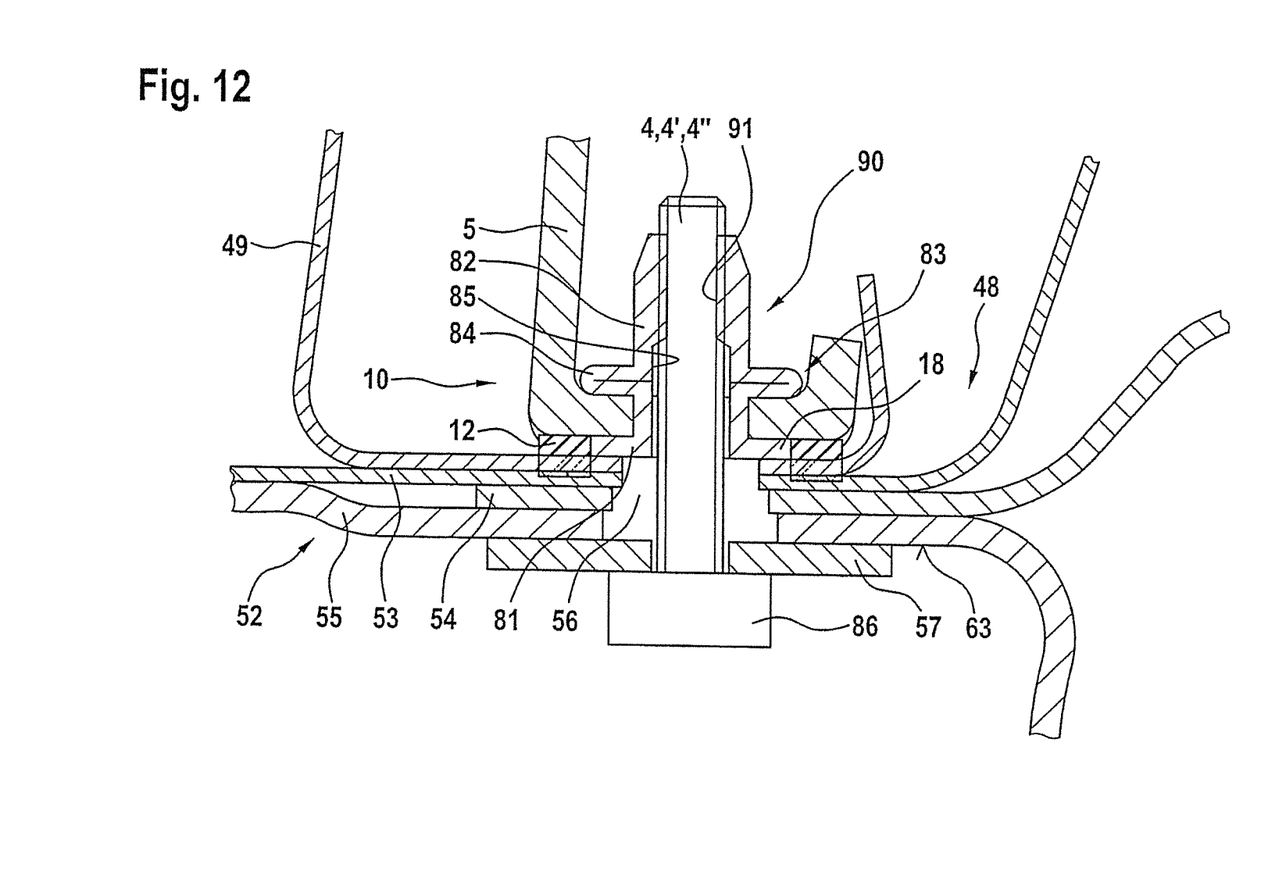

The exemplary embodiment of the FIG. 12 corresponds substantially to the exemplary embodiment of FIG. 11, so that reference is made to this exemplary embodiment in conjunction with the exemplary embodiment of FIGS. 1 to 10. However, the design of the fastening apparatus 10 and the use of the bolt element 4, preferably likewise designed as a threaded screw 4", is different. Instead of the blind rivet 80 according to FIG. 11, a blind rivet nut 90, also referred to as a rivet nut, is used in the exemplary embodiment of FIG. 12. This differs from the blind rivet 80 merely in that the through channel 85 is provided with an internal thread 91. During the fastening on the roof 48 of the vehicle (not shown in greater detail)—in contrast to the exemplary embodiments of FIGS. 1 to 11—the bolt element 4 is not inserted from the exterior into the fastening opening 56 in the roof 48, but from the interior of the roof 48 outwards, so that the head 86 of the threaded screw 4" is supported on the underside of the lower roof component 52, preferably with the interposition of the washer 57, passes through the fastening opening 56 as well as the fastening hole 37 and is screwed into the internal thread 91 of the blind rivet nut 90.

The invention claimed is:

1. A roof rail retainer with an adapter component, which has a fastening apparatus for mounting on a roof of a vehicle and a fastening device for mounting a roof rail of the vehicle, the fastening apparatus comprising:
    a bolt element provided with a thread;
    a compressible sealing ring for sealing a fastening opening on the roof of the vehicle, the compressible sealing ring surrounding the bolt element; and
    at least one supporting element associated with the bolt element, the at least one supporting element in contact with the adapter component or connected to the adapter component, and having at least one supporting surface for placement directly on the roof of the vehicle, the at least one supporting element being a spacer to prevent further compression of the sealing ring when the bolt element is fixed to the roof of the vehicle,
    wherein the sealing ring has a thickness in an axial direction of the bolt element, the thickness of the sealing ring in an uncompressed state is greater than a supporting length of the supporting element, the supporting length corresponding to a thickness of the supporting element in the axial direction,
    wherein the sealing ring or the sealing ring together with the supporting element is disposed in a recess in the adapter component, and
    wherein a depth of the recess is just as great as the supporting length of the supporting element.

2. The roof rail retainer according to claim 1, wherein the supporting element is disposed between the bolt element and the sealing ring.

3. The roof rail retainer according to claim 1, wherein the supporting element is formed integrally with the bolt element.

4. The roof rail retainer according to claim 1, wherein the supporting element is a flange of the bolt element.

5. The roof rail retainer according to claim 1, wherein the supporting element is a ring element attached to the bolt element.

6. The roof rail retainer according to claim 1, wherein the supporting element is fastened on the adapter component or is formed integrally with the adapter component.

7. The roof rail retainer according to claim 1, wherein the recess is an impression in the adapter component.

8. The roof rail retainer according to claim 1, wherein the bolt element is fastened on the adapter component by a screw fastening.

9. The roof rail retainer according to claim 1, further comprising a screw fastening selected from a group consisting of: an insert nut fastened to the adapter component, a rivet, a blind rivet fastened to the adapter component, a rivet nut, and a blind rivet nut fastened to the adapter component.

10. The roof rail retainer according to claim 1, wherein the adapter component is a sheet metal component.

11. The roof rail retainer according to claim 10, wherein the sheet metal component is a C profile.

12. The roof rail retainer according to claim 11, wherein the fastening device is offset with respect to the fastening apparatus in a longitudinal direction of the C profile.

13. The roof rail retainer according to claim 11, wherein the C profile has two profile bars, one of the profile bars has the fastening apparatus and the other one of the profile bars has the fastening device, wherein the other profile bar has a cut-out for access to a region of the fastening apparatus located in an interior of the C profile.

14. The roof rail retainer of claim 1, in combination with a roof rail assembly and a roof rail which is fastened by the fastening device to the adapter component.

15. The roof rail assembly of claim 14 in combination with a vehicle, wherein at least one roof panel and a roof having the lower roof component of the vehicle has a fastening opening into which the bolt element is inserted and with the fastening which is disposed on or attached to the bolt element and is supported on an underside of the lower roof component so that the supporting element, the at least one roof panel, the lower roof component and the fastening device as well as optionally the adapter component lie in contact with one another.

16. The roof rail retainer of claim 1, wherein the supporting element is a flange circumferentially carried by a shaft of the bolt element.

17. A fastening arrangement for mounting a roof rail with an adapter component on a roof of a vehicle in combination with the vehicle, the fastening arrangement comprising:
    a bolt element;
    a compressible sealing ring sealing a fastening opening on the roof of the vehicle, the compressible sealing ring surrounding the bolt element; and
    a flange circumferentially surrounding a shaft of the bolt element and defining a support element associated with the bolt element, the support element in direct contact with the roof of the vehicle,
    wherein the sealing ring has a thickness in an axial direction of the bolt element, the thickness of the sealing ring in an uncompressed state is greater than a supporting length of the supporting element in the axial direction, the supporting length corresponding to a thickness of the supporting element,
    wherein at least one of the sealing ring and the support element is disposed in a recess of the adapter component, a depth of the recess being as great as the supporting length of the supporting element, and wherein the sealing ring radially surrounds the supporting element and the supporting element limits compression of the sealing ring.

18. A fastening arrangement for mounting a roof rail with an adapter component on a roof of a vehicle in combination with the vehicle, the fastening arrangement comprising:

a bolt element;

a compressible sealing ring sealing a fastening opening on the roof of the vehicle, the compressible sealing ring surrounding the bolt element; and a flange circumferentially surrounding a shaft of the bolt element and defining a support element associated with the bolt element, the support element in direct contact with the roof of the vehicle, wherein the sealing ring has a sealing ring thickness in an axial direction of the bolt element greater than a flange thickness of the flange in the axial direction, and further wherein the sealing ring radially surrounds the supporting element and the supporting element limits compression of the sealing ring.

19. The roof rail retainer according to claim 1, in combination with the roof, the at least one supporting surface of the at least one supporting element directly engaged with the roof.

20. The roof rail retainer according to claim 19, wherein the at least one supporting element includes a contact surface opposite the at least one supporting surface that engages the adapter component and the compressible sealing ring is disposed between the adapter component and the roof.

* * * * *